United States Patent
Nienaber et al.

(10) Patent No.: US 10,947,432 B2
(45) Date of Patent: Mar. 16, 2021

(54) MAGNETIZABLE ABRASIVE PARTICLE AND METHOD OF MAKING THE SAME

(71) Applicant: 3M INNOVATIVE PROPERTIES COMPANY, St. Paul, MN (US)

(72) Inventors: Aaron K. Nienaber, Maplewood, MN (US); Joseph B. Eckel, Vadnais Heights, MN (US); Thomas J. Anderson, Cottage Grove, MN (US); Thomas J. Nelson, St. Paul, MN (US); Mark A. Lukowski, St. Paul, MN (US); Louis S. Moren, Mahtomedi, MN (US); Don V. West, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 92 days.

(21) Appl. No.: 16/343,892

(22) PCT Filed: Oct. 12, 2017

(86) PCT No.: PCT/US2017/056266
§ 371 (c)(1),
(2) Date: Apr. 22, 2019

(87) PCT Pub. No.: WO2018/080799
PCT Pub. Date: May 3, 2018

(65) Prior Publication Data
US 2019/0264081 A1   Aug. 29, 2019

Related U.S. Application Data

(60) Provisional application No. 62/412,470, filed on Oct. 25, 2016.

(51) Int. Cl.
*C09K 3/14* (2006.01)
*C04B 35/111* (2006.01)
*C04B 35/628* (2006.01)

(52) U.S. Cl.
CPC ........ *C09K 3/1436* (2013.01); *C04B 35/1115* (2013.01); *C04B 35/62842* (2013.01);
(Continued)

(58) Field of Classification Search
None
See application file for complete search history.

(56) References Cited

U.S. PATENT DOCUMENTS 1,930,788 A  10/1933 Buckner
2,216,728 A  10/1940 Benner
(Continued)

FOREIGN PATENT DOCUMENTS

CN  1299399 A  6/2001
CN  1830626    9/2006
(Continued)

OTHER PUBLICATIONS

Extended European Search Report, EP17865690.6, dated Jun. 3, 2020, 3 pages.
(Continued)

*Primary Examiner* — Pegah Parvini
*Assistant Examiner* — Ross J Christie
(74) *Attorney, Agent, or Firm* — Bradford B. Wright

(57) ABSTRACT

A method of making magnetizable abrasive particles includes: moistening the outer surfaces of ceramic particles with waterglass to provide moistened ceramic particles. Magnetizable particles are contacted with the moistened ceramic particles to provide powder-coated ceramic particles. The powder-coated ceramic particles are heated to at least a temperature sufficient to bond the magnetizable
(Continued)

particles of the powder-coated ceramic particles to the respective ceramic particles thereby providing the magnetizable abrasive particles. On a respective basis, each magnetizable abrasive particle comprises a respective ceramic particle having a magnetizable particles bonded thereto.

12 Claims, 3 Drawing Sheets

(52) U.S. Cl.
CPC .. *C04B 35/62876* (2013.01); *C04B 35/62892* (2013.01); *C04B 2235/3201* (2013.01); *C04B 2235/3217* (2013.01); *C04B 2235/3222* (2013.01); *C04B 2235/402* (2013.01); *C04B 2235/405* (2013.01); *C04B 2235/428* (2013.01); *C04B 2235/5292* (2013.01); *C04B 2235/656* (2013.01); *C04B 2235/6562* (2013.01); *C04B 2235/963* (2013.01)

(56) References Cited

U.S. PATENT DOCUMENTS

| | | |
|---|---|---|
| 2,318,570 A | 5/1943 | Carlton |
| 2,370,636 A | 3/1945 | Carlton |
| 2,527,044 A * | 10/1950 | Walton ............... C09K 3/1436 51/308 |
| 2,541,658 A * | 2/1951 | Masin ............... C09K 3/1436 51/307 |
| 2,857,879 A | 10/1958 | Johnson |
| 2,947,616 A | 8/1960 | Coes, Jr. |
| 2,958,593 A | 11/1960 | Hoover |
| 3,306,719 A | 2/1967 | Fringhian |
| 3,495,960 A | 2/1970 | Schladitz |
| 3,625,666 A | 12/1971 | James |
| 3,918,217 A | 11/1975 | Oliver |
| 4,008,055 A | 2/1977 | Phaal |
| 4,018,575 A | 4/1977 | Davis |
| 4,227,350 A | 10/1980 | Fitzer |
| 4,246,004 A | 1/1981 | Busch |
| 4,314,827 A | 2/1982 | Leitheiser |
| 4,331,453 A | 5/1982 | Dau |
| 4,609,380 A | 9/1986 | Barnett |
| 4,612,242 A | 9/1986 | Vesley |
| 4,623,364 A | 11/1986 | Cottringer |
| 4,652,274 A | 3/1987 | Boettcher |
| 4,652,275 A | 3/1987 | Bloecher |
| 4,734,104 A | 3/1988 | Broberg |
| 4,744,802 A | 5/1988 | Schwabel |
| 4,751,137 A | 6/1988 | Halg |
| 4,751,138 A | 6/1988 | Tumey |
| 4,770,671 A | 9/1988 | Monroe |
| 4,799,939 A | 1/1989 | Bloecher |
| 4,800,685 A | 1/1989 | Haynes, Jr. |
| 4,881,951 A | 11/1989 | Wood |
| 4,898,597 A | 2/1990 | Hay |
| 4,903,440 A | 2/1990 | Larson |
| 4,916,869 A | 4/1990 | Oliver |
| 4,933,373 A | 6/1990 | Moren |
| 4,985,340 A | 1/1991 | Palazzotto |
| 4,991,362 A | 2/1991 | Heyer |
| 5,009,675 A | 4/1991 | Kunz |
| 5,086,086 A | 2/1992 | Brown-Wensley |
| 5,137,542 A | 8/1992 | Buchanan |
| 5,152,917 A | 10/1992 | Pieper |
| 5,181,939 A | 1/1993 | Neff |
| 5,201,916 A | 4/1993 | Berg |
| 5,213,591 A | 5/1993 | Celikkaya |
| 5,236,472 A | 8/1993 | Kirk |
| 5,254,194 A | 10/1993 | Ott |
| 5,282,875 A | 2/1994 | Wood |
| 5,366,523 A | 11/1994 | Rowenhorst |
| 5,376,428 A | 12/1994 | Palazzotto |
| 5,380,390 A | 1/1995 | Tselesin |
| 5,385,954 A | 1/1995 | Palazzotto |
| 5,417,726 A | 5/1995 | Stout |
| 5,435,816 A | 7/1995 | Spurgeon |
| 5,454,844 A | 10/1995 | Hibbard |
| 5,500,273 A | 3/1996 | Holmes |
| 5,554,068 A | 9/1996 | Carr |
| 5,573,619 A | 11/1996 | Benedict |
| 5,591,239 A | 1/1997 | Larson |
| RE35,570 E | 7/1997 | Rowenhorst |
| 5,672,097 A | 9/1997 | Hoopman |
| 5,672,186 A | 9/1997 | Chesley |
| 5,681,217 A | 10/1997 | Hoopman |
| 5,681,361 A | 10/1997 | Sanders, Jr. |
| 5,700,302 A | 12/1997 | Stoetzel |
| 5,712,210 A | 1/1998 | Windisch |
| 5,817,204 A | 10/1998 | Tselesin |
| 5,833,724 A | 11/1998 | Wei |
| 5,851,247 A | 11/1998 | Stoetzel |
| 5,846,270 A | 12/1998 | Feygin et al. |
| 5,858,140 A | 1/1999 | Berger |
| 5,863,306 A | 1/1999 | Wei |
| 5,891,204 A | 4/1999 | Neff |
| 5,908,476 A | 6/1999 | Nishio |
| 5,928,070 A | 7/1999 | Lux |
| 5,942,015 A | 8/1999 | Culler |
| 5,946,991 A | 9/1999 | Hoopman |
| 5,975,987 A | 11/1999 | Hoopman |
| 5,984,988 A | 11/1999 | Berg |
| 6,017,831 A | 1/2000 | Beardsley |
| 6,048,375 A | 4/2000 | Yang |
| 6,083,631 A | 7/2000 | Neff |
| 6,120,568 A | 9/2000 | Neff |
| 6,129,540 A | 10/2000 | Hoopman |
| 6,139,594 A | 10/2000 | Kincaid |
| 6,207,246 B1 | 3/2001 | Moren |
| 6,261,682 B1 | 7/2001 | Law |
| 6,293,980 B2 | 9/2001 | Wei |
| 6,302,930 B1 | 10/2001 | Lux |
| 6,319,108 B1 | 11/2001 | Adefris |
| 6,354,929 B1 | 3/2002 | Adefris |
| 6,521,004 B1 | 2/2003 | Culler |
| 6,551,366 B1 | 4/2003 | D'Souza |
| 6,620,214 B2 | 9/2003 | McArdle |
| 6,645,624 B2 | 11/2003 | Adefris |
| 6,702,650 B2 | 3/2004 | Adefris |
| 6,790,126 B2 | 9/2004 | Wood |
| 6,817,935 B2 | 11/2004 | Bates |
| 6,881,483 B2 | 4/2005 | McArdle |
| 6,913,824 B2 | 7/2005 | Culler |
| 6,951,504 B2 | 10/2005 | Adefris |
| 7,399,330 B2 | 7/2008 | Schwabel |
| 7,410,413 B2 | 8/2008 | Woo |
| 7,491,251 B2 | 2/2009 | Welygan |
| 7,727,931 B2 | 6/2010 | Brey |
| 7,887,608 B2 | 2/2011 | Schwabel |
| 8,034,137 B2 | 10/2011 | Erickson |
| 8,142,531 B2 | 3/2012 | Adefris |
| 8,142,532 B2 | 3/2012 | Erickson |
| 8,142,891 B2 | 3/2012 | Culler |
| 8,262,758 B2 | 9/2012 | Gao |
| 8,425,278 B2 | 4/2013 | Culler |
| 8,698,394 B2 | 4/2014 | McCutcheon |
| 8,869,740 B2 | 10/2014 | Moren |
| 9,440,332 B2 | 9/2016 | Gaeta |
| 2001/0041511 A1 | 11/2001 | Lack |
| 2002/0160694 A1 | 10/2002 | Wood |
| 2003/0022604 A1 | 1/2003 | Annen |
| 2003/0143938 A1 | 7/2003 | Braunschweig |
| 2005/0022457 A1 | 2/2005 | Chen |
| 2005/0218566 A1 | 10/2005 | Suzuki |
| 2005/0279028 A1 | 11/2005 | Keipert |
| 2007/0254560 A1 | 11/2007 | Woo |
| 2008/0131705 A1 | 6/2008 | Colburn |
| 2008/0289262 A1 | 11/2008 | Gao |
| 2009/0100766 A1 | 4/2009 | Gebhardt |
| 2009/0165394 A1 | 7/2009 | Culler |
| 2009/0169816 A1 | 7/2009 | Erickson |
| 2010/0146867 A1 | 6/2010 | Boden |

(56) References Cited

U.S. PATENT DOCUMENTS

| | | |
|---|---|---|
| 2010/0151196 A1 | 6/2010 | Adefris |
| 2011/0088330 A1 | 4/2011 | Beekman |
| 2011/0289854 A1* | 12/2011 | Moren ............... B24D 11/001 51/295 |
| 2012/0137597 A1 | 6/2012 | Adefris |
| 2012/0227333 A1 | 9/2012 | Adefris |
| 2013/0040537 A1 | 2/2013 | Schwabel |
| 2013/0125477 A1 | 5/2013 | Adefris |
| 2013/0244552 A1 | 9/2013 | Lee |
| 2013/0252521 A1 | 9/2013 | Kasashima |
| 2013/0252522 A1 | 9/2013 | Kasashima |
| 2013/0344786 A1 | 12/2013 | Keipert |
| 2014/0000176 A1 | 1/2014 | Moren |
| 2014/0080393 A1 | 3/2014 | Ludwig |
| 2014/0106126 A1 | 4/2014 | Gaeta |
| 2014/0237907 A1 | 8/2014 | Boden |
| 2014/0259961 A1 | 9/2014 | Moren |
| 2014/0290147 A1 | 10/2014 | Seth |
| 2014/0291895 A1 | 10/2014 | Kanade |
| 2015/0004890 A1 | 1/2015 | Haerle |
| 2015/0259587 A1 | 9/2015 | Oldenkotte et al. |
| 2015/0267097 A1 | 9/2015 | Rosenflanz |
| 2015/0291865 A1* | 10/2015 | Breder ............... B24D 3/14 51/309 |
| 2016/0144480 A1 | 5/2016 | Eugster et al. |
| 2016/0221153 A1 | 8/2016 | Rizzo, Jr. |

FOREIGN PATENT DOCUMENTS

| | | |
|---|---|---|
| CN | 101353566 | 1/2009 |
| CN | 101481597 A | 7/2009 |
| CN | 101780664 A | 7/2010 |
| CN | 103590090 | 2/2014 |
| CN | 104191385 | 12/2014 |
| CN | 104999385 | 10/2015 |
| DE | 3042643 | 7/1981 |
| DE | 102012221316 | 5/2014 |
| DE | 202014101741 | 6/2014 |
| DE | 102013212609 | 12/2014 |
| DE | 102013212617 | 12/2014 |
| DE | 102013212639 | 12/2014 |
| DE | 102013212666 | 12/2014 |
| DE | 102013212684 | 12/2014 |
| EP | 1122718 A2 | 8/2001 |
| EP | 2692818 A1 | 5/2014 |
| GB | 396231 | 8/1933 |
| GB | 1477767 | 6/1977 |
| JP | 63232947 | 9/1988 |
| JP | 0778509 | 3/1995 |
| JP | 11165252 | 6/1999 |
| JP | 2002053367 | 2/2002 |
| JP | 2004098265 | 4/2004 |
| JP | 2004098266 | 4/2004 |
| JP | 2005153106 | 6/2005 |
| JP | 2006089586 | 4/2006 |
| JP | 2006089586 A * | 4/2006 |
| JP | 2012131017 | 7/2012 |
| JP | 2012131018 | 7/2012 |
| JP | 2015155142 | 8/2015 |
| JP | 5982580 | 8/2016 |
| KR | 1020100136807 | 12/2010 |
| KR | 101473367 | 5/2014 |
| SU | 1495100 | 7/1989 |
| WO | 94-27833 | 12/1994 |
| WO | 2009-011973 | 1/2009 |
| WO | 2010-041645 | 4/2010 |
| WO | 2012-112305 | 8/2012 |
| WO | 2015-048768 | 4/2015 |
| WO | 2015-088953 | 6/2015 |
| WO | 2015-100018 | 7/2015 |
| WO | 2015-100020 | 7/2015 |
| WO | 2015-100220 | 7/2015 |
| WO | 2017-136188 | 8/2017 |
| WO | 2018-080703 | 5/2018 |
| WO | 2018-080704 | 5/2018 |
| WO | 2018-080705 | 5/2018 |
| WO | 2018-080755 | 5/2018 |
| WO | WO 2018-080756 | 5/2018 |
| WO | WO 2018-080784 | 5/2018 |

OTHER PUBLICATIONS

Barbee, Jr., "Microstructure of amorphous 304 stainless steel-carbon alloys synthesized by magnetron sputter deposition", Thin Solid Films, 1979, vol. 63, No. 1, pp. 143-150.

Rampal, "Comparing the Magnetic Abrasives by Investigating the Surface Finish", Journal of Engineering, Computers & Applied Sciences (JEC&AS), Oct. 2012, vol. 1, No. 1, pp. 20-24.

Sodium and Potassium Silicates, PQ Europe, Oct. 2004, 16 pages.

International Search Report for PCT International Application No. PCT/US2017/056266, dated Jan. 23, 2018, 3 pages.

Co-Pending Application, "Magnetizable Abrasive Particle and Method of Making the Same", U.S. Appl. No. 16/338,756, filed Apr. 2, 2019.

* cited by examiner

MAGNETIZABLE ABRASIVE PARTICLE AND METHOD OF MAKING THE SAME

TECHNICAL FIELD

The present disclosure broadly relates to abrasive particles, abrasive articles, and methods of making them.

BACKGROUND

Various types of abrasive articles are known in the art. For example, coated abrasive articles generally have abrasive particles adhered to a backing by a resinous binder material. Examples include sandpaper and structured abrasives having precisely shaped abrasive composites adhered to a backing. The abrasive composites generally include abrasive particles and a resinous binder.

Bonded abrasive particles include abrasive particles retained in a binder matrix that can be resinous or vitreous. Examples include, grindstones, cutoff wheels, hones, and whetstones.

Precise placement and orientation of abrasive particles in abrasive articles such as, for example, coated abrasive articles and bonded abrasive articles has been a source of continuous interest for many years.

For example, coated abrasive articles have been made using techniques such as electrostatic coating of abrasive particles have been used to align crushed abrasive particles with the longitudinal axes perpendicular to the backing. Likewise, shaped abrasive particles have been aligned by mechanical methods as disclosed in U.S. Pat. Appl. Publ. No. 2013/0344786 A1 (Keipert).

Precise placement and orientation of abrasive particles in bonded abrasive articles has been described in the patent literature. For example, U.S. Pat. No. 1,930,788 (Buckner) describes the use of magnetic flux to orient abrasive grain having a thin coating of iron dust in bonded abrasive articles. Likewise, British (GB) Pat. No. 396,231 (Buckner) describes the use of a magnetic field to orient abrasive grain having a thin coating of iron or steel dust to orient the abrasive grain in bonded abrasive articles. Using this technique, abrasive particles were radially oriented in bonded wheels.

U.S. Pat. Appl. Publ. No. 2008/0289262 A1 (Gao) discloses equipment for making abrasive particles in even distribution, array pattern, and preferred orientation. Using electric current to form a magnetic field causing acicular soft magnetic metallic sticks to absorb or release abrasive particles plated with soft magnetic materials.

There is a continuing need for new materials and methods for bonding magnetic materials to abrasive particles.

SUMMARY

Advantageously, the present disclosure provides new methods of bonding magnetizable particles to abrasive particles using waterglass.

The present inventors unexpectedly discovered that the method can also be effective for selectively bonding the abrasive particles to certain portions of some abrasive particles. While depositing a layer of magnetizable material onto abrasive particles using bulk techniques such as solution coating, powder coating, or vapor coating is typically relatively straightforward process, it is much more difficult to deposit magnetizable material at a precise location on only a portion of the surface of abrasive particle. The problem is compounded when factors such as reproducibility, productivity, and cost are taken into account. Advantageously, the present method of making magnetizable abrasive particles overcomes these problems in certain embodiments.

In one aspect, the present disclosure provides a method of making magnetizable abrasive particles, the method comprising steps:

a) providing ceramic particles, each ceramic particle having a respective outer surface;

b) moistening the outer surfaces of ceramic particles with waterglass to provide moistened ceramic particles; and c) contacting magnetizable particles with the moistened ceramic particles to provide powder-coated ceramic particles; and d) heating the powder-coated ceramic particles to at least a temperature sufficient to bond the magnetizable particles of the powder-coated ceramic particles to the respective ceramic particles on which they are coated, thereby providing the magnetizable abrasive particles, wherein, on a respective basis, each magnetizable abrasive particle comprises a respective ceramic particle having at least some of the magnetizable particles bonded thereto.

As used herein:

The term "ceramic" refers to any of various hard, brittle, heat- and corrosion-resistant materials made of at least one metallic element (which may include silicon) combined with oxygen, carbon, nitrogen, or sulfur. Ceramics may be crystalline or polycrystalline, for example.

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials may be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated in a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferromagnetic at 20° C., or capable of being made so, unless otherwise specified. Preferably, magnetizable layers according to the present disclosure either have, or can be made to have by exposure to an applied magnetic field, a magnetic moment of at least 0.001 electromagnetic units (emu), more preferably at least 0.005 emu, more preferably 0.01 emu, up to an including 0.1 emu, although this is not a requirement.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 gauss (1 mT), preferably at least about 100 gauss (10 mT), and more preferably at least about 1000 gauss (0.1 T).

The term "magnetizable" means capable of being magnetized or already in a magnetized state.

The term "moist" means slightly wet; damp.

The term "shaped abrasive particle" refers to a ceramic abrasive particle that has been intentionally shaped (e.g., extruded, die cut, molded, screen-printed) at some point during its preparation such that the resulting ceramic body is non-randomly shaped. The term "shaped abrasive particle" as used herein excludes ceramic bodies obtained by a mechanical crushing or milling operation.

The term "platey crushed abrasive particle", which refers to a crushed abrasive particle resembling a platelet and/or flake that is characterized by a thickness that is less than the width and length. For example, the thickness may be less than ½, ⅓, ¼, ⅕, ⅙, 1/7, ⅛, 1/9, or even less than 1/10 of the length and/or width. Likewise, the width may be less than ½, ⅓, ¼, ⅕, ⅙, 1/7, ⅛, 1/9, or even less than 1/10 of the length.

The term "essentially free of" means containing less than 5 percent by weight (e.g., less than 4, 3, 2, 1, 0.1, or even less than 0.01 percent by weight, or even completely free) of, based on the total weight of the object being referred to.

The terms "precisely-shaped abrasive particle" refers to an abrasive particle wherein at least a portion of the abrasive particle has a predetermined shape that is replicated from a mold cavity used to form a precursor precisely-shaped abrasive particle that is sintered to form the precisely-shaped abrasive particle. A precisely-shaped abrasive particle will generally have a predetermined geometric shape that substantially replicates the mold cavity that was used to form the abrasive particle.

The term "length" refers to the longest dimension of an object.

The term "width" refers to the longest dimension of an object that is perpendicular to its length.

The term "thickness" refers to the longest dimension of an object that is perpendicular to both of its length and width.

The term "aspect ratio" refers to the ratio length/thickness of an object.

The term "substantially" means within 35 percent (preferably within 30 percent, more preferably within 25 percent, more preferably within 20 percent, more preferably within 10 percent, and more preferably within 5 percent) of the attribute being referred to.

The suffix "(s)" indicates that the modified word can be singular or plural.

Features and advantages of the present disclosure will be further understood upon consideration of the detailed description as well as the appended claims.

Figure 1:
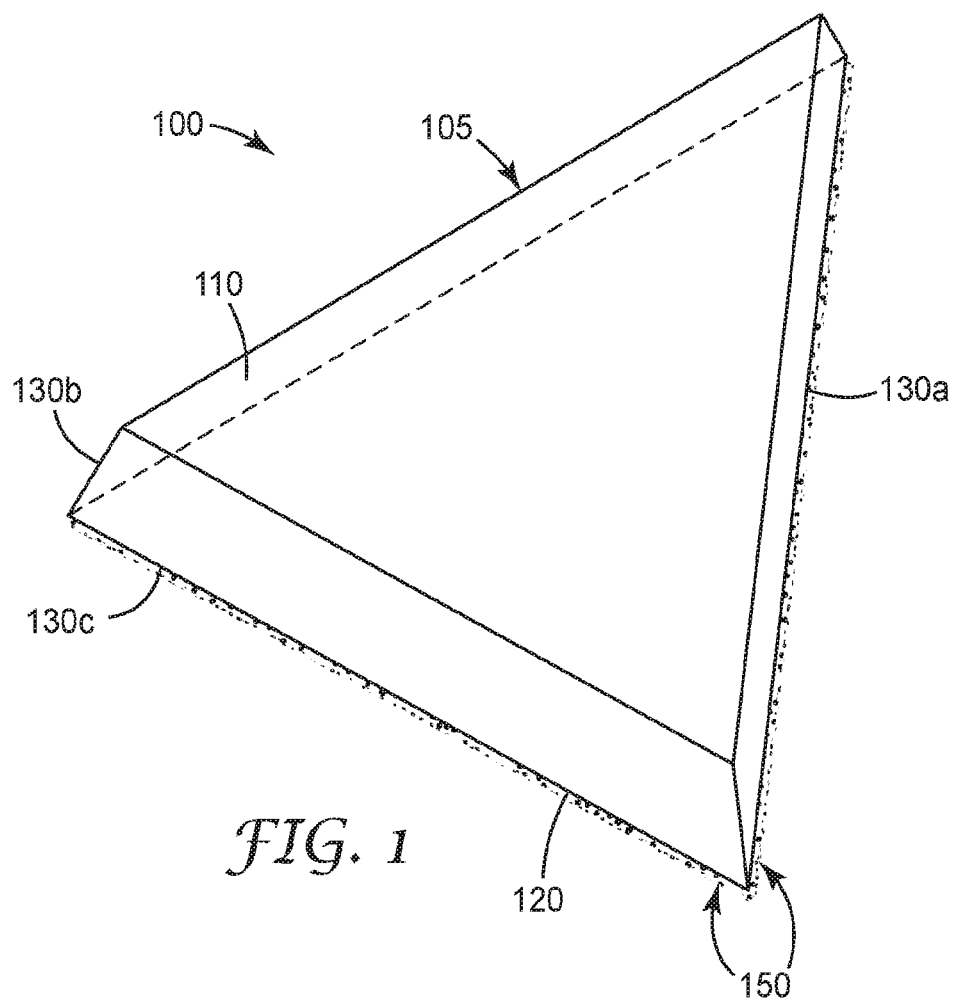
FIG. 1 is a schematic perspective view of an exemplary magnetizable abrasive particle 100 according to one embodiment of the present disclosure.
Figure 1A:
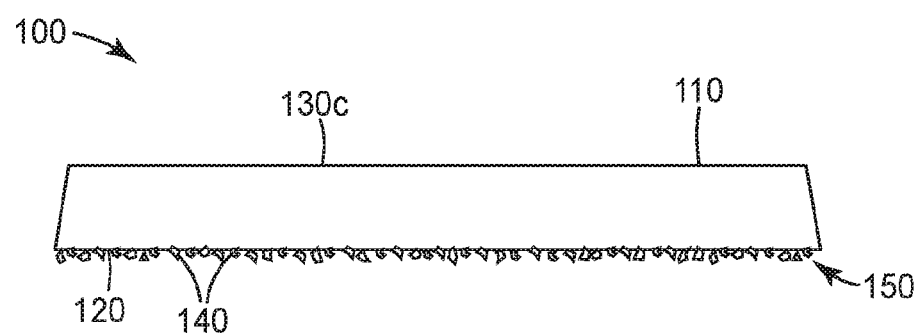
FIG. 1A is a schematic side view of magnetizable abrasive particle 100.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Methods according to the present disclosure include a series of sequential steps, which may be consecutive or not.

In a first step, ceramic particles are provided, ceramic particle has a respective outer surface. The ceramic particles can be particles of any abrasive material. Useful ceramic materials that can be used as include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minn., black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). Further details concerning methods of making sol-gel-derived abrasive particles can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U.S. Publ. Pat. Appln. Nos. 2009/0165394 A1 (Culler et al.) and 2009/0169816 A1 (Erickson et al.).

The ceramic particles may be shaped (e.g., precisely-shaped) or random (e.g., crushed and/or platey). Shaped ceramic particles and precisely-shaped ceramic particles may be prepared by a molding process using sol-gel technology as described, for example, in U.S. Pat. No. 5,201,916 (Berg), U.S. Pat. No. 5,366,523 (Rowenhorst (Re 35,570)), U.S. Pat. No. 5,984,988 (Berg), U.S. Pat. No. 8,142,531 (Adefris et al.), and U.S. Pat. Appln. Publ. No. 2010/0146867 (Boden et al.).

U.S. Pat. No. 8,034,137 (Erickson et al.) describes ceramic alumina particles that have been formed in a specific shape, then crushed to form shards that retain a portion of their original shape features. In some embodiments, the ceramic particles are precisely-shaped (i.e., the ceramic particles have shapes that are at least partially determined by the shapes of cavities in a production tool used to make them).

Exemplary shapes of ceramic particles include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms). In some embodiments (e.g., truncated pyramids and prisms), the ceramic particles respectively comprise platelets having two opposed major facets connected to each other by a plurality of side facets.

In some embodiments, the ceramic particles comprise crushed abrasive particles having an aspect ratio of at least 2, at least 3, at least 5, or even at least 10, although this is not a requirement.

Preferably, ceramic particles used in practice of the present disclosure have a Mohs hardness of at least 6, at least 7, or at least 8, although other hardnesses can also be used.

Further details concerning ceramic particles suitable for use as abrasive particles and methods for their preparation can be found, for example, in U.S. Pat. No. 8,142,531 (Adefris et al.), U.S. Pat. No. 8,142,891 (Culler et al.), and U.S. Pat. No. 8,142,532 (Erickson et al.), and in U.S. Pat. Appl. Publ. Nos. 2012/0227333 (Adefris et al.), 2013/0040537 (Schwabel et al.), and 2013/0125477 (Adefris).

In a subsequent step, the outer surfaces of the ceramic particles are moistened with waterglass to provide moistened ceramic particles. This step can be accomplished by any suitable method such as, for example, mixing dry ceramic particles with a small amount of water glass that is sufficient to moisten the ceramic particles, or immersing the ceramic particles in waterglass and removing excess waterglass to provide moistened ceramic particles. Typically, the entire outer surface of each ceramic particle is moistened in this step; however, this is not a requirement. Mixing may be accomplished by mechanical methods (e.g., a mixer), for example. Removal of excess waterglass may be accomplished by suction, evaporation, or other suitable method, for example. Other methods may also be used.

As used herein, the term "waterglass" refers to an aqueous solution of alkali silicate(s) (e.g., lithium, sodium, and/or potassium silicate) and combinations thereof. Alkali silicate is the common name for compounds with the formula $(SiO_2)_n(M_2O)$ and their hydrates where n is a positive integer and M is an alkali metal (e.g., sodium or potassium). A well-known member of this series is sodium metasilicate, $Na_2SiO_3$ (i.e., n=1, M=Na), which is commercially available in anhydrous and hydrated forms (e.g., $Na_2SiO_3 \cdot 5H_2O$). While water should generally be the primary liquid component, organic co-solvents (e.g., methanol, ethanol, isopropanol, glyme, diglyme, propylene glycol, and/or acetone) may also be present. Other components such as, for example, surfactant(s), thickener(s), thixotrope(s), and colorant(s), may be included in the waterglass if desired.

The concentration of alkali silicate in the waterglass is not critical (as long as it is dissolved and the waterglass is liquid), but it is preferably from 25 to 70 percent by weight, more preferably 30 to 55 percent by weight. In this context, percent by weight is to be calculated based on the anhydrous form of alkali silicate(s) that is/are present in the waterglass.

The magnetic particles comprise magnetizable material such as, for example: iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite; zinc ferrite; nickel ferrite; cobalt ferrite, magnesium ferrite, barium ferrite, and strontium ferrite; yttrium iron garnet; and combinations of the foregoing. In some preferred embodiments, the magnetizable material comprises at least one metal selected from iron, nickel, and cobalt, an alloy of two or more such metals, or an alloy of at one such metal with at least one element selected from phosphorus and manganese. In some preferred embodiments, the magnetizable material is an alloy containing 8 to 12 weight percent (wt. %) aluminum, 15 to 26 wt. % nickel, 5 to 24 wt. % cobalt, up to 6 wt. % copper, up to 1% titanium, wherein the balance of material to add up to 100 wt. % is iron.

The magnetizable particles may have any size, but are preferably much smaller than the ceramic particles as judged by average particle diameter, preferably 4 to 2000 times smaller, more preferably 100 to 2000 times smaller, and even more preferably 500 to 2000 times smaller, although other sizes may also be used. In this embodiment, the magnetizable particles may have a Mohs hardness of less than 6 (e.g., less than 5, or less than 4), although this is not a requirement.

After the ceramic particles are moistened with the waterglass, the magnetizable particles are contacted with the moistened ceramic particles to provide powder-coated ceramic particles. This may be done in any suitable method including, for example, powder coating, mechanically mixing, or fluidized bed coating. Preferably, an excess of the magnetizable particles is used in order to facilitate maximal coating of the moistened ceramic particles. The magnetizable particles bound to the ceramic core may be in direct contact with it, or they may be in indirect contact through intervening magnetizable particles to which they are bound. In some preferred embodiments, the magnetizable particles are in direct contact with the ceramic particles. The deposited magnetizable particles form a magnetizable layer (continuous or discontinuous) that is preferably from 1/10 to 1/4 of the thickness of the ceramic particle, although this is not a requirement.

Excess magnetizable particles may be removed at this point or after heating, for example, as described below.

The powder-coated ceramic particles are heated to at least a temperature sufficient to bond the magnetizable particles of the powder-coated ceramic particles to the respective ceramic particles on which they are coated, thereby providing the magnetizable abrasive particles. On a respective basis, each magnetizable abrasive particle comprises a ceramic particle having the magnetizable particles bonded thereto. Suitable heating temperatures will typically vary based on the composition of the ceramic particles and magnetizable particles. For sodium silicate waterglass and alumina ceramic particles, heating temperatures of at least 300° F. (149° C.) for a time of at least 30 minutes are typically sufficient, although higher and lower temperatures and/or times may also be used.

Magnetizable abrasive particles and/or ceramic particles used in their manufacture according to the present disclosure may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F16, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, J1524, JIS36, JIS46, J1554, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, magnetizable abrasive particles and/or ceramic particles used in their manufacture according to the present disclosure can be graded to a nominal screened grade using U.S. A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the ceramic particles pass through a test sieve meeting ASTM E-11 specifications for the number 18 sieve and are retained on a test sieve meeting ASTM E-11 specifications for the number 20 sieve. In one embodiment, the ceramic particles have a particle size such that most of the particles pass through an 18 mesh test sieve and can be retained on a 20, 25, 30, 35, 40, 45, or 50 mesh test sieve. In various embodiments, the ceramic particles can have a nominal screened grade of: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size can be used such as −90+100.

The present inventors unexpectedly discovered that certain ceramic particles can be preferentially coated on specific portions of their outer surfaces with the magnetizable particles. For example, alumina shaped abrasive particles that are formed by a molding process in which the ceramic particle precursor (e.g., alumina precursor) is dried while in an open-faced mold and removed to form a shaped particle precursor, may have higher affinity for bonding the magnetizable particles to the open (i.e., exposed) face of the shaped ceramic particle precursor while still in the mold than mold surfaces (i.e., surface(s) that contact the mold cavity wall (s)).

For example, referring now to FIG. 1, magnetizable abrasive particle 100 that has a ceramic particle 105 shaped as a truncated trigonal pyramid with opposed major surfaces 110 and 120 connected by sidewalls 130a, 130b, 130c. Major surface 120 corresponds to an open surface during manufacture of the ceramic particle, while the remaining surfaces all correspond to mold surfaces. Magnetizable particles 140 form a layer 150 and are bound to major surface 120.

Figure 2:
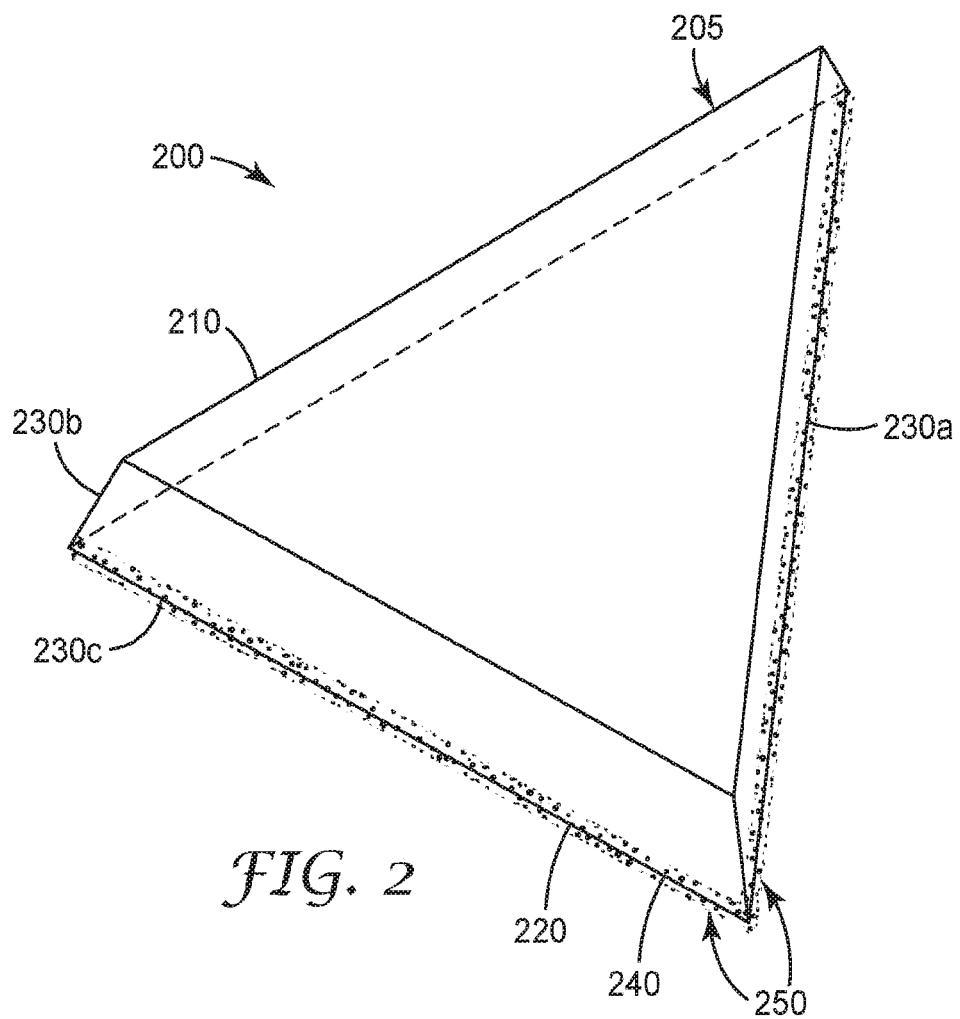
FIG. 2 is a schematic perspective view of an exemplary magnetizable abrasive particle 200 according to one embodiment of the present disclosure.
Figure 2A:
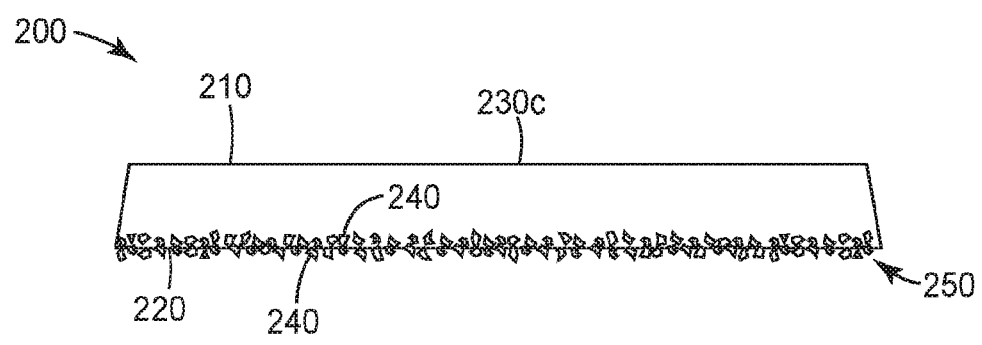
FIG. 2A is a schematic side view of magnetizable abrasive particle 200.

In certain embodiments, the magnetizable particles may also be bound to adjacent portions of the sidewalls. Referring now to FIG. 2, it shows a magnetizable abrasive particle 200 that has a ceramic particle 205 shaped as a truncated trigonal pyramid with opposed major surfaces 210 and 220 connected by sidewalls 230a, 230b, 230c. Major surface 220 corresponds to an open surface during manufacture of the ceramic particle, while the remaining surfaces all correspond to mold surfaces. Magnetizable particles 240 form a layer 250 and are bound to major surface 220 and adjacent portions of sidewalls 230a, 230b, 230c.

Without wishing to be bound theory, the present inventors believe that differences in surface morphology during the drying step while still in the mold in the manufacture of the ceramic particles leads to the preferential deposition of the magnetizable particles. In particular, it is believed that surfaces exposed to air during drying become favored for later bonding with the magnetizable particles. In those cases where preferential deposition of the magnetizable particles on the open surface and portions of the sidewalls adjacent to it occurs, it is believed that shrinkage away from the mold cavity wall during drying results in an air interface and similar surface properties as the open surface during drying exposed Magnetizable abrasive particles prepared according to the present disclosure can be used in loose form (e.g., free-flowing or in a slurry) or they may be incorporated into various abrasive articles (e.g., coated abrasive articles, bonded abrasive articles, nonwoven abrasive articles, and/or abrasive brushes). Due to their magnetic properties, the magnetizable abrasive particles can be oriented and manipulated using a magnetic field to provide the above various abrasive articles with controlled abrasive particle orientation and position.

SELECT EMBODIMENTS OF THE PRESENT DISCLOSURE

In a first embodiment, the present disclosure provides a method of magnetizable abrasive particles, the method comprising steps:

a) providing ceramic particles, each ceramic particle having a respective outer surface;

b) moistening the outer surfaces of the ceramic particles with waterglass to provide moistened ceramic particles; and c) contacting magnetizable particles with the moistened ceramic particles to provide powder-coated ceramic particles; and d) heating the powder-coated ceramic particles to at least a temperature sufficient to bond the magnetizable particles of the powder-coated ceramic particles to the respective ceramic particles thereby providing the magnetizable abrasive particles, wherein, on a respective basis, each magnetizable abrasive particle comprises a respective ceramic particle having at least some of the magnetizable particles bonded thereto.

In a second embodiment, the present disclosure provides a method according to the first embodiment, wherein, on a respective basis, each ceramic particle comprises a receptive surface and at least one other surface, wherein some of the magnetizable particles are bonded preferentially to a contiguous area of the outer surface of the ceramic particles that includes the receptive surface, and wherein a majority by area of the at least one other surface is free of magnetizable particles bonded to the ceramic particle.

In a third embodiment, the present disclosure provides a method according to the first or second embodiment, wherein the ceramic particles comprise alumina.

In a fourth embodiment, the present disclosure provides a method according to any one of the first to third embodiments, wherein the magnetizable particles comprises at least one of iron or nickel.

In a fifth embodiment, the present disclosure provides a method according to any one of the first to fourth embodiments, wherein the magnetizable particles comprise an alloy comprising iron, silicon, and aluminum.

In a sixth embodiment, the present disclosure provides a method according to any one of the first to fifth embodiments, wherein the waterglass consists essentially of sodium silicate dissolved in water.

In a seventh embodiment, the present disclosure provides a method according to any one of the first to sixth embodiments, wherein the ceramic particles are formed by a molding process, wherein, on a respective basis, each receptive surface corresponds to an opening of a mold cavity having an interior surface, and wherein each one of the at least one other surface corresponds to the interior surface of the mold cavity.

In an eighth embodiment, the present disclosure provides a method according to any one of the first to seventh embodiments, wherein the ceramic particles comprise ceramic platelets, each respectively having first and second opposed major surfaces connected to each other by a plurality of sidewalls, and wherein the first major surface is the receptive surface.

In a ninth embodiment, the present disclosure provides a method according to the eighth embodiment, wherein the ceramic platelets are triangular.

In a tenth embodiment, the present disclosure provides a method according to the eighth or ninth embodiment, wherein the second major surfaces are essentially free of bonded magnetizable particles.

In an eleventh embodiment, the present disclosure provides a method according to the any one of the eighth to tenth embodiments, wherein each one of the plurality of sidewalls is essentially free of bonded magnetizable particles.

In a twelfth embodiment, the present disclosure provides a method according to any one of the eighth to eleventh embodiments, wherein the ceramic platelets are shaped as a truncated triangular pyramids.

In a thirteenth embodiment, the present disclosure provides magnetizable abrasive particles prepared according to any one of the first to twelfth embodiments.

In a fourteenth embodiment, the present disclosure provides magnetizable abrasive particles according to the thirteenth embodiment, wherein the magnetizable abrasive particles conform to an abrasives industry specified nominal grade.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Mo., or may be synthesized by known methods.

Material abbreviations used in the Examples are listed in Table 1, below.

TABLE 1

| ABBRE-VIATION | DESCRIPTION |
|---|---|
| SAP1 | Shaped abrasive particles prepared according to the Preparation of SAP1 procedure hereinbelow. |
| SAP2 | Shaped abrasive particles were prepared according to the disclosure of paragraph [0095] in U.S. Pat. No. 8,142,531 (Adefris et al.). The shaped abrasive particles were prepared by molding alumina sol gel in equilateral triangle-shaped polypropylene mold cavities. After drying and firing, the resulting shaped abrasive particles were about 2.5 millimeter (side length) × 0.5 millimeter (thickness), with a draft angle of approximately 98 degrees. |
| SIL | Sodium silicate, obtained as BW-50 from PQ Corporation, Malvern, Philadelphia |
| SUR | Surfactant, obtained as DOWFAX 2A1 from Dow Chemical Company, Midland, Michigan |
| MAG | Fe/Al/Si magnetizable alloy particles, obtained as SENDUST SP-3B from Mate Co., Ltd., Okayama Prefecture, Japan |

Preparation of SAP1

SAP1 was prepared generally according to the disclosure of U. S. Patent Publication No. 2015/0267097 (Rosenflanz et al). A slurry mixture was prepared using the following recipe: aluminum oxide powder (70.73 parts) obtained as RG 4000 from Almatis, Rotterdam, Netherlands, aluminum oxide monohydrate powder (7.07 parts) obtained as DISPERAL from Sasol North America, Houston, Tex., was dispersed by high shear mixing a solution containing water (21.57 parts) and 70% aqueous nitric acid (0.63 parts). The mixture was milled at 120 revolutions per minute for 24 hours. After milling, the milling media was removed and the slurry was degassed by placing it into a desiccator jar and applying a vacuum using mechanical pump (about 10 minutes hold under vacuum). The resulting slurry was poured onto a polyethylene tooling having triangular shaped mold cavities with a draft angle of 98 degrees between the sidewall and bottom of the mold. The tooling had a topical coating of mineral oil deposited by drying from a 5 weight percent ethanol solution. The slurry was spread into the cavities using a squeegee so that the openings of the production tooling were completely filled. The tooling containing the ceramic slurry was then dried under a heat gun. Following drying the sheet was vigorously shaken to dislodge the resulting shaped abrasive precursor particles. The shaped abrasive precursor particles were calcined by placing them in an alumina crucible and heating to 700° C. (heating rate 10° C. per minute) in air. No isothermal hold was applied. About 300 grams of the calcined shaped abrasive precursor particles were placed in an alumina crucible and sintered in a Model KKSK-666-3100 electrically heated furnace from Keith Furnaces of Pico Rivera, Calif., using a heating rate of 25° C. per minute and a hold time of 45 min at the final temperature approximately 1500-1550° C. The resulting shaped abrasive particles were about 2.5 mm (side length)×0.50 mm (thickness).

Surface Roughness Measurement

The surface roughness measurement was performed on both open face (the exposed face of the shaped particle precursor while still in the mold during the molding process) and mold face (the major surface that contacted the mold cavity bottom wall while still in the mold during sol-gel molding process) of SAP1 and SAP2. The test was measured as the average surface roughness ($R_a$) in micrometers using a Zeta Instruments Zeta-300 Optical Profilometer from Zeta Instruments, San Jose, Calif., according to the manufacturer's instructions. The test results of $R_a$ are shown in Table 2, below.

TABLE 2

| | AVERAGE SURFACE ROUGHNESS $R_a$, micrometers | |
|---|---|---|
| | OPEN FACE | MOLD FACE |
| SAP1 | 0.74 | 0.37 |
| SAP2 | 0.24 | 0.20 |

Example 1

A water glass mix was prepared by mixing 20 grams of SIL, 10 grams of water and 0.06 grams of SUR and stirring for approximately 1 minute. 125 grams of SAP1 and 1.5 grams of water glass mix were placed in to a container. After applying a lid to the container, the mixture was shaken vigorously by hand for 1 minute. Then 2.56 grams of MAG was added on top of the mixture in the container. The container was once again shaken by hand for about 1 minute. The mixture in the container was then poured out over an aluminum pan. The mixture was spread out as much as possible to prevent the mineral from binding together. The pan was placed in a solvent rated batch oven at the following cycle: 15 minutes at 200° F. (93.3° C.), 30 minutes at 250° F. (121.1° C.), 30 minutes at 300° F. (148.9° C.), and 30 minutes at 350° F. (176.7° C.).

Figure 3:
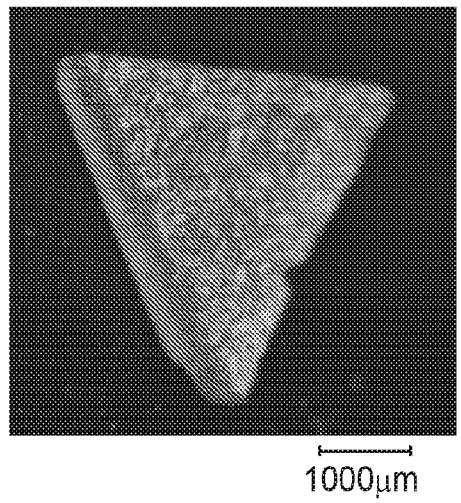
FIG. 3 is a digital photograph of a magnetizable abrasive particle prepared in Example 1 showing its open face.
Figure 4:
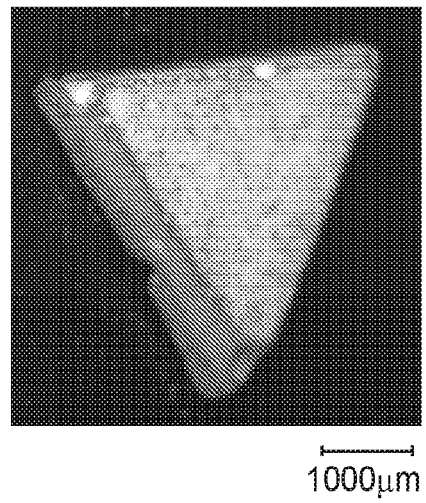
FIG. 4 is a digital photograph of a magnetizable abrasive particle prepared in Example 1 showing its mold face.
Figure 5:
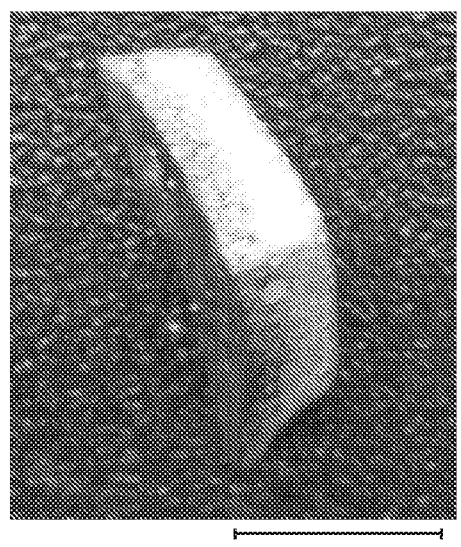
FIG. 5 a digital photograph of a magnetizable abrasive particle prepared in Example 1 showing its side view.

Digital photographs were taken of a representative resulting magnetizable abrasive particle to show the open face (see FIG. 3), mold face (see FIG. 4) and a side view (see FIG. 5). The amount of MAG coated on the open face of the magnetizable abrasive particle was much more than that coated on mold face of the magnetizable abrasive particle.

Example 2

Figure 6:
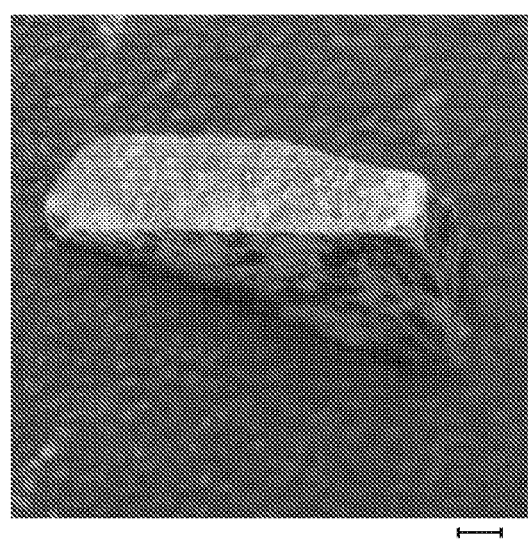
FIG. 6 is a digital photograph of a magnetizable abrasive particle made in Example 2.

The procedure generally described in Example 1 was repeated, except that SAP2 was used instead of SAP1. A representative resulting magnetizable abrasive particle is shown in FIG. 6.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making magnetizable abrasive particles, the method comprising steps:
    a) providing ceramic particles, each ceramic particle having a respective outer surface;
    b) moistening the outer surfaces of the ceramic particles with waterglass to provide moistened ceramic particles; and
    c) contacting magnetizable particles with the moistened ceramic particles to provide powder-coated ceramic particles; and
    d) heating the powder-coated ceramic particles to at least a temperature sufficient to bond the magnetizable particles of the powder-coated ceramic particles to the respective ceramic particles thereby providing the magnetizable abrasive particles, wherein, on a respective basis, each magnetizable abrasive particle comprises a respective ceramic particle having at least some of the magnetizable particles bonded thereto, and
    wherein, on a respective basis, each ceramic particle comprises a receptive surface and at least one other surface, wherein some of the magnetizable particles are bonded preferentially to a contiguous area of the outer surface of the ceramic particles that includes the receptive surface, and wherein a majority by area of the at least one other surface is free of magnetizable particles bonded to the ceramic particle.

2. The method of claim 1, wherein the ceramic particles comprise alumina.

3. The method of claim 1, wherein the magnetizable particles comprise at least one of iron or nickel.

4. The method of claim 1, wherein the magnetizable particles comprise an alloy comprising iron, silicon, and aluminum.

5. The method of claim 1, wherein the waterglass consists essentially of sodium silicate dissolved in water.

6. The method of claim 1, wherein the ceramic particles are formed by a molding process, wherein, on a respective basis, each receptive surface corresponds to an opening of a mold cavity having an interior surface, and wherein each one of the at least one other surface corresponds to the interior surface of the mold cavity.

7. The method of claim 1, wherein the ceramic particles comprise ceramic platelets, each respectively having first and second opposed major surfaces connected to each other by a plurality of sidewalls, and wherein the first major surface is the receptive surface.

8. The method of claim 7, wherein the ceramic platelets are triangular.

9. A method of making magnetizable abrasive particles, the method comprising steps:
    a) providing ceramic particles, each ceramic particle having a respective outer surface;
    b) moistening the outer surfaces of the ceramic particles with waterglass to provide moistened ceramic particles; and
    c) contacting magnetizable particles with the moistened ceramic particles to provide powder-coated ceramic particles; and
    d) heating the powder-coated ceramic particles to at least a temperature sufficient to bond the magnetizable particles of the powder-coated ceramic particles to the respective ceramic particles thereby providing the magnetizable abrasive particles,
    wherein, on a respective basis, each magnetizable abrasive particle comprises a respective ceramic particle having at least some of the magnetizable particles bonded thereto,
    wherein the ceramic particles comprise ceramic platelets, each respectively having first and second opposed major surfaces connected to each other by a plurality of sidewalls, and wherein the first major surface is the receptive surface, and
    wherein the second major surface is essentially free of bonded magnetizable particles.

10. The method of claim 7, wherein each one of the plurality of sidewalls is essentially free of bonded magnetizable particles.

11. The method of claim 7, wherein the ceramic platelets are shaped as truncated triangular pyramids.

12. Magnetizable abrasive particles prepared according to claim 1.

* * * * *

UNITED STATES PATENT AND TRADEMARK OFFICE
CERTIFICATE OF CORRECTION

PATENT NO. : 10,947,432 B2
APPLICATION NO. : 16/343892
DATED : March 16, 2021
INVENTOR(S) : Nienaber et al.

It is certified that error appears in the above-identified patent and that said Letters Patent is hereby corrected as shown below:

In the Specification

Column 2
Line 56, Delete "in" and insert -- to --, therefor.

Column 2
Line 62, Delete "ferromagnetic at" and insert -- ferrimagnetic at --, therefor.

Column 7
Line 16, Delete "JI524," and insert -- JIS24, --, therefor.

Column 7
Line 16, Delete "J1554," and insert -- JIS54, --, therefor.

Signed and Sealed this
Nineteenth Day of April, 2022

Katherine Kelly Vidal
*Director of the United States Patent and Trademark Office*